July 21, 1925.
H. B. FABER
PROCESS OF DESICCATION
Filed Feb. 24, 1920
1,546,922
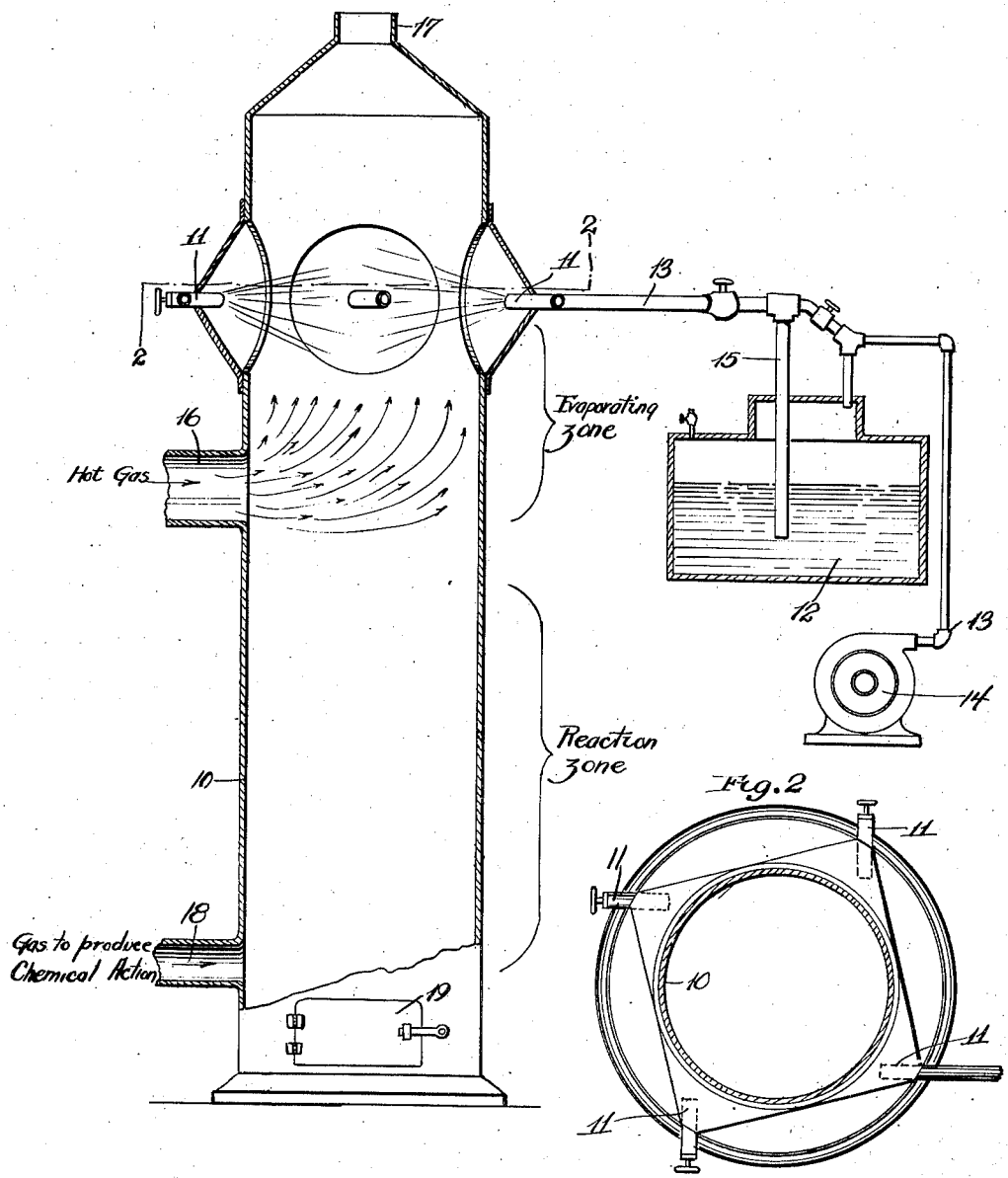
INVENTOR.
Henry B. Faber
BY Edgar M. Kitchin
His ATTORNEY.

Patented July 21, 1925.

1,546,922

UNITED STATES PATENT OFFICE.

HENRY B. FABER, OF NEW YORK, N. Y., ASSIGNOR TO ATOMIZED PRODUCTS CORPORATION, OF NEW YORK, N. Y., A CORPORATION OF NEW YORK.

PROCESS OF DESICCATION.

Application filed February 24, 1920. Serial No. 360,729.

*To all whom it may concern:*

Be it known that I, HENRY B. FABER, a citizen of the United States, residing at New York, in the county of New York and State of New York, have invented certain new and useful Improvements in Processes of Desiccation; and I do hereby declare the following to be a full, clear, and exact description of the invention, such as will enable others skilled in the art to which it appertains to make and use the same.

The present invention relates to the art of desiccation of solid particles in liquids, and more particularly to the process of evaporation and treatment of the particles during and subsequent to desiccation.

The object of this invention is to provide a process of desiccating and treating solid constituents of liquids in a manner to protect the solid particles of desiccation from subsequent deliquescence and the resultant rapid deterioration and cohesion of the particles under normal atmospheric and other conditions which at the present time are found to destroy the effect of desiccation.

The present invention relates more particularly to the protection of the solid particle produced by desiccation with a rind or protective coating produced by a chemical action during the process, and to provide such a rind or coating which will not readily yield under ordinary conditions to solubility or penetration by ordinary gases and moisture met with in handling and transporting the solid particles or powder produced.

The process also embraces other phases as will hereinafter in part be brought out and in part become apparent.

While the means and apparatus for practicing the process of this invention may be of various kinds, the accompanying drawing discloses one form of apparatus which may be used.

In the accompanying drawing,—

Figure 1 is a vertical sectional view through a desiccating tower and adjacent parts constructed to carry out the steps of the present process.

Figure 2 is a transverse section taken on the line 2—2 of Figure 1, and showing the arrangement of the spraying nozzles.

Referring to the drawing by numerals, 10 designates a tower which may be of any desired height, such, for example, as fifty feet, and provided, near its top, such as at a height of approximately forty feet from the base of the tower, with one or more atomizing nozzles 11 which, as shown in Figure 2, projects substantially at a tangent into the tower and are arranged to discharge in the same direction, and are located in substantially the same horizontal plane, so as to produce a whirling nebula cloud adapted to assume a spiral path in falling toward the base of the tower. The sprayer nozzles 11 are fed with liquid from a tank 12 by the injector and pressure action of air introduced through a pipe 13 from a blower 14. The pipe 13 has a feed or branch pipe 15 which projects into the tank 12 and terminates in closely spaced relation from the bottom thereof for drawing off the contents of the tank 12 and feeding the same through the pipe 13 to the sprayer nozzles 11.

The nebulous cloud falling down through the tower 10 is treated with a counter-moving column or body of hot gas delivered to the tower 10 from an inlet 16 located substantially midway between the upper and lower ends of the tower, to form, between the inlet 16 and the sprayer nozzles 11, an evaporating zone wherein the hot gases rise through the nebulized liquid and drive off moisture from the solid particles, and substantially suspend the solid particles in their whirling planetary movements until such particles form planetesimals, by cohesion and subsequent evaporation, of sufficient weight to overcome the influx of hot gases to fall through the same into the lower end of the tower 10. The tower 10 has a stack or outlet pipe 17 which serves for the escape of the moisture-laden gases, and the outlet pipe may be of desired diameter and equipped in any desired manner to regulate the upward flow of the column of gases in the tower. These hot gases introduced through the inlet 16 are of the required temperature for effecting evaporation, and of necessity the temperature varies widely to meet conditions found in different kinds of solid constituents and in different kinds of liquids.

Beneath the evaporating zone the tower is provided with a reaction zone, and to effect the latter, the tower 10 is provided near the base thereof, such as approximately five feet above the bottom of the tower, with a second or lower inlet 18 adapted to receive a gas capable of producing chemical action with respect to the exterior surfaces or films which encase the solid particles as the latter fall from the evaporating zone. The chemical action desired is to produce a rind, crust or film, about the particles or planetesimals, which casing or jacket for the particles is of a nature to resist absorption by the particles of moisture from the air; to offset cohesion between the particles when accumulated upon the base of the tower; and to render the particles practically insoluble except under various desired conditions in the use of the desiccated or powdered product.

The tower 10 is provided at its base with a door 19 which may be opened for the removal of accumulated dried and incrustated particles.

In practice, it is necessary to use a liquid having characteristics which produce the exterior crust or rind when subjected to certain gases which have a reactionary effect upon the evaporated particles which fall toward the evaporating zone. For example, a solution of crude rubber in benzene may be atomized in the tower 10, treated in the evaporating zone to drive off moisture from the solid particles, then passed through the reaction zone where the gas used may be either sulphur dioxide or sulphur chloride, either of which will produce a chemical action upon the surface of the rubber particles, forming thereon a rind by chemically changing the rubber and giving it the physical property of elasticity or vulcanization. Another example of carrying out the process of this invention is in the atomizing of color making materials. In this use, it is possible to obtain a particle of solid substance whose color shade it is desired to tone. It is known that certain metallic salts produce various color sulphides, such as cadmium produces yellow; antimony produces orange; bismuth produces brown, and copper produces black. The color solution or slurry has added to it a solution of these metallic salts, and the resulting solution is atomized, passed through the evaporating zone to recover the dry particles from the solution, and is then passed through a reaction zone formed of sulphuretted hydrogen gas which forms a thin film of metallic sulphide enveloping the particle and modifying the shade, such toning of the shade being under complete control of the operator.

Also, if potassium hydrate solution be atomized, evaporated and otherwise treated in the same manner, with a reaction zone of carbonic acid gas, the result will be that the particle will be encased in a substantial coating of potassium carbonate.

It is, of course, understood that the process of this invention embodies various combinations and modifications of the different specifically recited steps, and also embodies the combinations of several or all of the steps, as recited in the appended claims.

What is claimed is:—

1. The process which consists in subjecting a solid containing liquid in finely divided state to a gaseous desiccating medium to provide the solid matter thereof in the form of a dry powder, and subjecting the dry powdered particles immediately and while in gaseous suspension to the action of a further gaseous medium reacting chemically thereon.

2. Process of producing coated particles, which consists in atomizing into a gaseous desiccating medium a liquid containing solid matter in solution, and capable of combining with a gas, to provide the solid matter in dry powdered form, subjecting the particles immediately upon drying and while in gaseous suspension to a gaseous medium reacting chemically thereon to provide the same with a coating, and then removing the particles.

3. Process of producing coated particles, which consists in atomizing a solution of rubber in benzene to provide the rubber in dry powdered form, and subjecting the rubber particles immediately upon drying while in gaseous suspension to sulphur chloride vapors, and then removing the particles.

In testimony whereof I affix my signature.

HENRY B. FABER.